Figure 1:
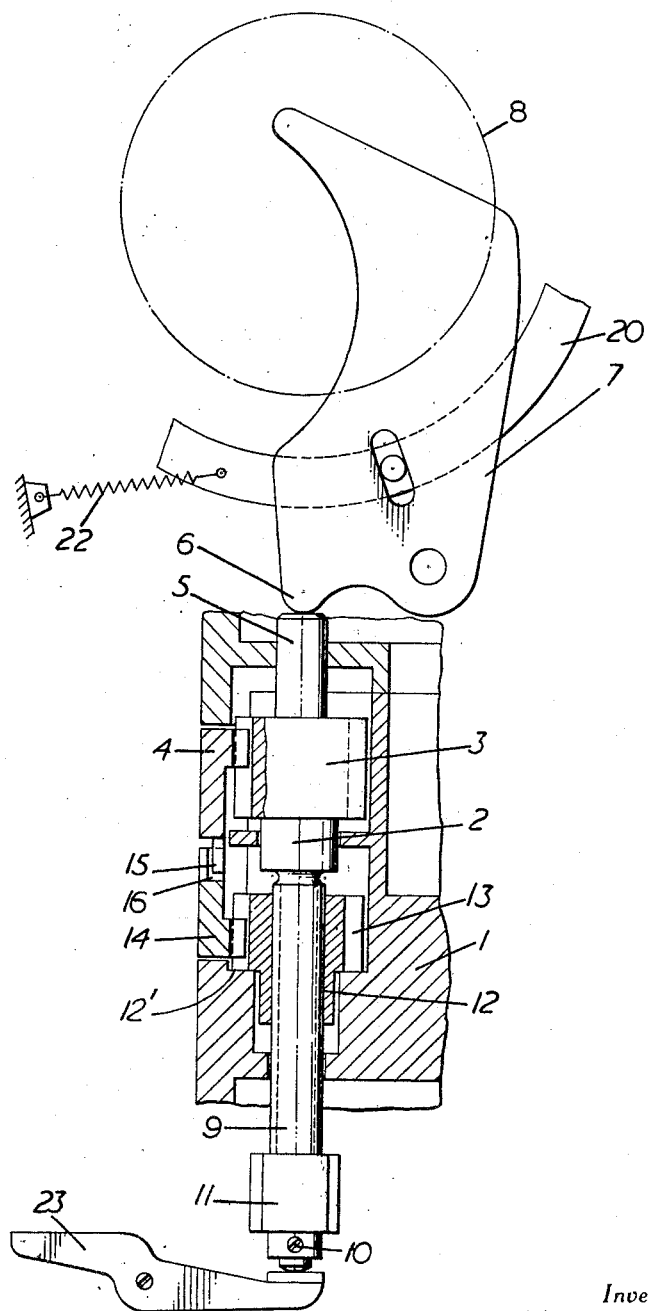

INVENTORS
WERNER HAHN
ROLF NOACK
By Irwin L. Thompson
ATTY.

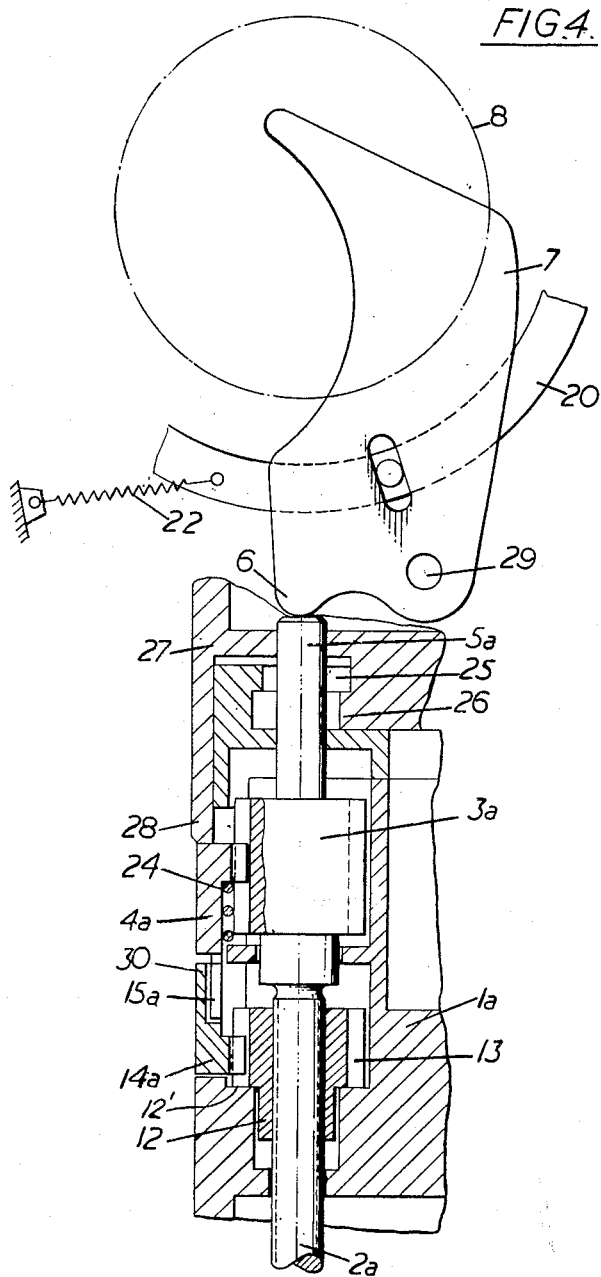

United States Patent Office 3,099,192
Patented July 30, 1963

3,099,192
DIFFERENTIAL GEARING FOR SETTING LIGHT VALUES
Werner Hahn and Rolf Noack, Dresden, Germany, assignors to VEB Kamera- und Kinowerke Dresden, Dresden, Germany
Filed Sept. 16, 1960, Ser. No. 56,571
12 Claims. (Cl. 95—10)

The present invention relates to photographic cameras having a differential gear mechanism for the setting of the exposure factors of diaphragm aperture and exposure time, the values of which are variable by means of setting elements.

The known differential gear mechanisms of this nature are of such type that where the diaphragm is used as an auxiliary shutter or for the requirements on single lens mirror reflex cameras, that is to say, where the diaphragm sets itself from extreme positions to the pre-selected value, special transmission members had to be provided for the complete opening or closing of the diaphragm. Similarly, transmission members separate from one another were necessary also, so that on the one hand a follow-up pointer representing the light value could be made by the differential gear to follow an exposure-meter pointer and on the other hand the setting elements for exposure time and diaphragm aperture could be connected by gearing with a differential gear for the purpose of totalling of the set exposure values.

The object of the invention is the provision of a differential gearing suitable above all for the requirements in interchangeable objective lenses, wherein a part of the differential gearing serves, on the one hand, for the representation of the light value formed from the sum of the adjustable exposure factors and, on the other hand, for the transmission of any of the exposure factors to be set or for the transference of the diaphragm into one of the extreme positions.

In accordance with the invention there is provided a photographic camera have a housing, a diaphragm exposure control means, a time exposure control means mounting on the housing; the provision of a differential gearing comprising a first toothed setting element for adjusting the time exposure control means and the diaphragm exposure control means at constant light value, a second toothed element for independently adjusting one of said exposure control means, a threaded spindle mounted in the housing so as to be rotatable about the axis of said spindle and axially movable in the housing, a first coupling means connecting said spindle with the first setting element and a second coupling means connecting said spindle with the second setting element, said first coupling means including a threaded bushing into which the spindle is screwed, and a pinion on said bushing, said pinion being in engagement with the toothing on the first setting element, and said second coupling means including a pinion fixedly mounted on said spindle which meshes with the toothing of the second setting element. The threaded spindle is preferably coupled in the axial direction with the diaphragm and the threaded bushing is preferably coupled with the exposure time setting element, so that the diaphragm setting movement comprises displacement in the axial direction of the threaded spindle. Thus the additional advantage is obtained that the axial shifting of the spindle is suitable both for the setting of the diaphragm to the pre-selected value and also for the movement of the diaphragm into the requisite extreme positions.

According to one special feature of the invention the light value setting element possesses a lug which is freely movable in a recess defined by stops of the setting element coupled with the threaded bushing. This recess corresponds to the range of the values, to be covered by the axial setting movement of the threaded spindle, of the exposure factor controlled thereby, for example the diaphragm aperture. Consequently, when an end value of the exposure factor settable through the threaded spindle (for example the diaphargm aperture) is reached, the setting element for the other exposure factor (that is to say, for example, the exposure time) is automatically entrained, so that the entire light value range can be covered with the light value setting element.

For the purpose of adaptation of exchangeable objective lenses of different focal lengths the setting element coupled with the threaded bushing preferably possesses a recess defined by a plurality of stops. Consequently, a recess of different longitudinal extents is obtained which corresponds to the ranges of the diaphragm values to be covered by the setting movement of the threaded spindle in the case of exchangeable objective lenses of different focal lengths. The light value setting element is expediently loaded with a spring which opposes the coupling engagement of its lug with this recess.

The details of the invention may be seen from the constructional examples as represented and described hereinafter.

Figure 2:
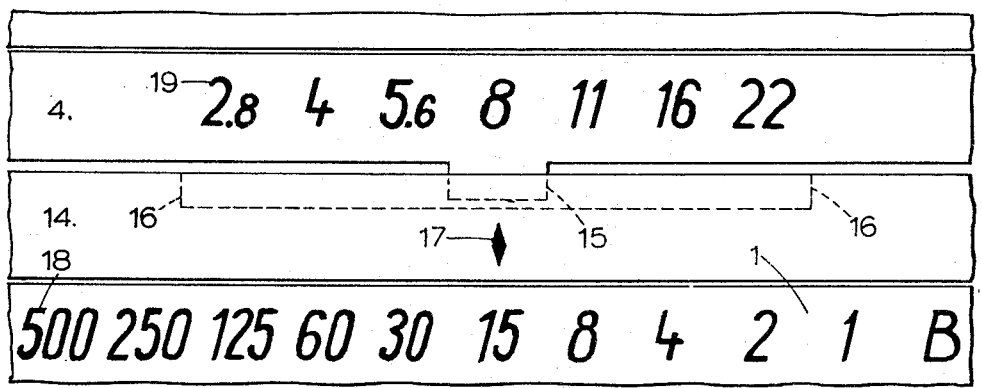
Figure 5:
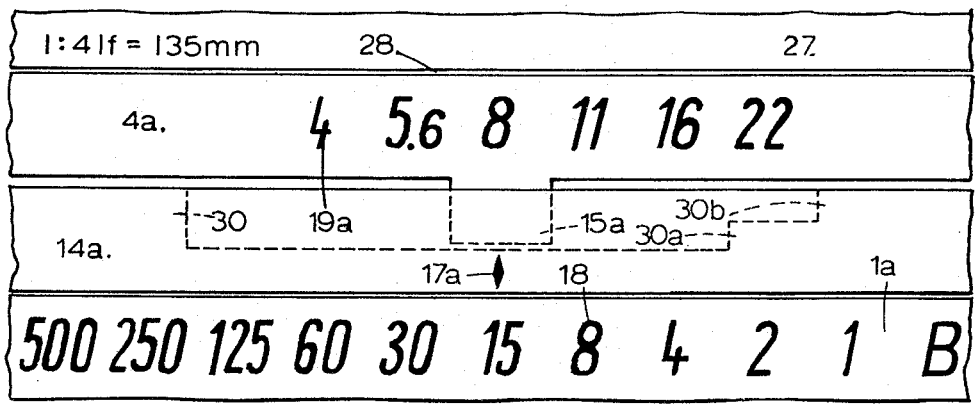
Figure 6:
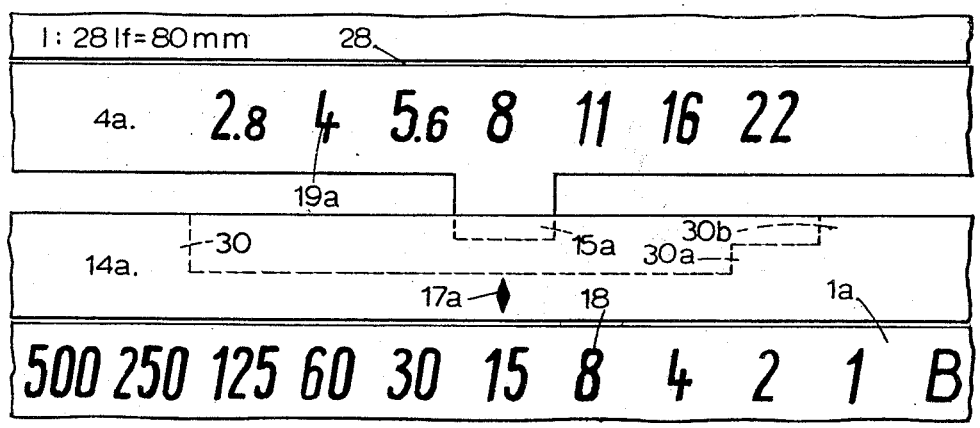
Figure 3:
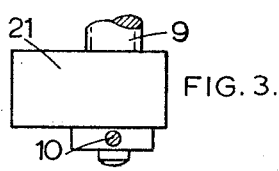

FIGURE 1 shows the differential gearing suitable for one single diaphragm range;
FIGURE 2 shows the setting elements of the differential gearing as illustrated in FIGURE 1;
FIGURE 3 shows a cam disc;
FIGURE 4 shows the differential gearing suitable for various diaphragm ranges; and
FIGURES 5 and 6 show the setting elements of the differential gearing as illustrated in FIGURE 4 in various coupling positions.

In the housing 1 (see FIGURE 1) the threaded spindle 2 is mounted for rotation about its axis and for axial movement. Fixedly attached to the spindle 2 is a pinion 3 which meshes with a toothing of the light value setting element 4. The cam 6 of a diaphragm blade 7 is drawn against the upper end 5 of the spindle 2 by the spring 22 engaging on the diaphragm ring 20. Of the diaphragm blades 7 lying in the objective aperture 8 only one has been illustrated, for the sake of simplicity. The other diaphragm blades are connected in the same manner with the ring 20. At the other end 9 of the spindle 2 there is secured by means of the screw 10 the pinion 11. According to choice the cam disc 21 (see FIGURE 3) can be secured there instead.

Over the threaded spindle 2 there is screwed a threaded bushing 12, which is provided with a pinion 13. This pinion 13 is in engagement with a toothing of the exposure time setting ring 14, which is connected in known manner with a shutter mechanism.

The light value setting element 4 (see FIGURE 2) provided with diaphragm value scale 9, possesses a lug 15 which is freely movable in a recess of the exposure time setting ring 14, defined by the stops 16. The exposure time setting ring 14 possesses a mark 17 (FIGURE 2), which can be read off in relation to the time scale 18 fast with the housing.

The manner of operation of the arrangement is as follows:

The diaphragm blades 7 may be pivoted out of their extreme position in the present case from set aperture position to an open position for viewing, by axial displacement of the threaded spindle 2 as a result of rotation of the lever 23 which can be coupled with the camera cocking mechanism. The pinions 3 and 13 move axially and remain in engagement with the toothed setting elements 4 and 14. The blades 7 move to their preset positions under the influence of the spring 22 on release of the lever 23. The preset positions are determined by the engagement of the bushing 12 with the shoulder 12'. The exposure factors may be set with the blades in a fully open position of the aperture or either a partly or fully closed position. By rotation of the light value setting element 4 numbered with the diaphragm values 19 the ratio of diaphragm and exposure time, that is to say the light values, corresponding to the existing brightness is set. This is effected by the axial displacement of the spindle 2 caused as a result of the screw connection between the spindle 2 and the bushing 12, in the form that the diaphragm values 19 are varied in relation to the exposure time values 18 which at first remain constant. The requisite ratio can be read off directly through the juxtaposition in pairs of the diaphragm scale 19 and time scale 18, but also through a follow-up pointer of known style of construction, controlled by the rotation of the spindle 2. For the latter purpose the spindle 2 is provided with a pinion 11 or a cam disc 21, which transmits the rotation of the spindle 2 to the follow-up pointer, which is to be brought into coincidence with the pointer of the measuring instrument in known manner.

When the correct light value is set, by rotation of the exposure time setting ring 14 the pairing of diaphragm aperture and exposure time can be selected, the set light value remaining unchanged. This is achieved through a threaded connection 12' between the spindle 2 and the bush 12, because on rotation of the time setting ring 14 not only is the exposure time varied in known manner, but also at the same time by means of the said threaded connection an axial displacement of the threaded spindle 2 with respect to the bush 12 is effected. The spindle 2 acts upon the diaphragm 7 so that the diaphragm is then changed together with the exposure time with the combined aperture-time value remaining unaltered.

When in the rotation of the light value setting element 4 the mark 17 reaches an end value of the diaphragm scale 19, the lug 15 places itself against one of the stops 16 of the time setting ring 14 and entrains the latter. In this shifting movement no change of the combined aperture/time value takes place because in this case no relative movement occurs between the spindle 2 and the bushing 12, the spindle and bushing rotate uniformly. However, the exposure time is varied in relation to this constant diaphragm value, because the rotating exposure time setting ring 14 in known manner varies the exposure time of the shutter.

If in special types of cameras there is no necessity to shift the diaphragm to an extreme position, the setting element for the exposure time could be coupled with the spindle 2 and a toothed diaphragm setting ring could mesh with the pinion 13 of the threaded bushing. Without any absolute necessity of utilizing the advantages of the axial spindle movement for the transference of the diaphragm into extreme positions, the new differential gearing is further usable as a setting device which is simple in operation, which by rotation of the light value setting element 4 renders possible a variation of the light value over the entire light value range and by rotation of the setting ring 14 renders possible a selection of diaphragm-time.

A further example of embodiment is illustrated in FIGURES 4 to 6.

In the housing 1a (see FIGURE 4) the threaded spindle 2a is mounted in rotatable and slidable fashion. It carries pinion 3a, which meshes with a toothing of the light value setting member 4a. The cam 6 of a diaphragm blade 7 of the diagrammatically illustrated diaphragm is drawn against the upper end 5a of the spindle 2a by the spring 22 acting upon the diaphragm ring 20. For the sake of simplicity, only one of the diaphragm blades 7 lying in the objective aperture 8 is illustrated. The other diaphragm blades are connected in the same manner with the ring 20.

Over the threaded spindle 2a there is again screwed the threaded bushing 12, which has the pinion 13 integrally formed therewith. This pinion 13 engages in a toothing of the exposure-time setting ring 14a, which is connected in known manner with a shutter mechanism.

The light value setting member 4a (see FIGURES 5 and 6) marked with diaphragm values is provided with the lug 15a, which is freely movable in a recess, defined by the stops 30, 30a and 30b, of the exposure-time setting ring 14a. The spring 24 (see FIGURE 4), seeks to press the light value setting element 4a with the lug 15a out of the recess. The stops 30a and 30b (FIGURES 5 and 6) form a length difference of the recess to the extent of the shifting path of the light value setting member 4a for a diaphragm value. The exposure setting ring 14a possesses a mark 17a, against which the time scale 18, fast with the housing, and the movable diaphragm scales 19a can be read off.

In the housing 1a there is further secured by means of the bayonet connection 25, 26 (see FIGURE 4) the objective lens mount body 27 carrying the pivot pins 29 of the diaphragm blades 7, and comprising the diagrammatically illustrated diaphragm; the diaphragm blades 7 can obviously also swing in a plane disposed perpendicularly of the optical axis. The axial extent of the collar 28 in the case of objective lenses with different diaphragm ranges varies. The collar is therefore of different dimensions, so as to cause in the case of an objective with the maximum possible diaphragm aperture $f4$ the lug 15a to lie in the region of the stop 30a (see FIGURE 5) and in the case of an objective with the maximum possible diaphragm aperture $f2.8$ the lug 15a to lie in the region of the stop 30b (see FIGURE 6).

The manner of operation of the arrangement is as follows:

In the fitting of an objective lens on the housing 1a the collar 28 of the objective mount body 27 moves the light value setting member 4a against the action of the spring 24, so that the lug 15a comes to lie in the recess of the exposure-time setting member 14a, defined by the stops 30, 30a and 30b. According to the axial displacement of the collar 28, which is in inverse proportion to the settable maximum diaphragm aperture, the lug 15a lies in the path of the stop 30a or 30b. If thus an objective lens is fitted whose maximum possible diaphragm aperture amounts to $f4$ (see FIGURE 5), then for example on rotation of the light value setting member 4a the lug 15a, as a result of contact with the stop 30a, will entrain the exposure-time setting ring 14a earlier than is the case if an objective is attached whose maximum possible diaphragm apertures amounts to $f2.8$ (see FIGURE 6).

The same arrangement can logically alternatively be used for interchangeable shutters, which possess different, exposure time ranges. In this case the scale 18 would be provided with diaphragm values and the scale 19 with exposure-time values. The axial displacement of the spindle 2a would then act upon the regulating mechanism for exposure times, while the setting element 14a would be coupled with the objective diaphragm.

We claim:

1. A photographic camera having a housing, a diaphragm exposure control means mounted on the housing, a time exposure control means mounted on the housing; the provision of a differential gearing comprising a first toothed setting element for adjusting the time exposure control means and the diaphragm exposure control means at constant light value, a second toothed setting element for independently adjusting one of said exposure control means, a threaded spindle mounted in the housing so as to be rotatable about the axis of said spindle and axially movable in the housing, a first coupling means connecting said spindle with the first setting element, and a second coupling means connecting said spindle with the second setting element, said first coupling means including a threaded bushing into which the spindle is screwed and a pinion on said bushing, said pinion being in engagement with the toothing on the first setting element, and said second coupling means including a pinion fixedly mounted on said spindle which meshes with the toothing of the second setting element.

2. In a photographic camera having a housing, a plurality of blades pivotally mounted in the housing to form a diaphragm aperture, a blade driving ring, exposure time mechanism, and a shutter cocking mechanism; the provision of a differential gearing for setting the exposure factors of diaphragm aperture and exposure time, the gearing comprising a first toothed setting element for adjusting the exposure time and the diaphragm aperture at constant light value, a second toothed setting element for independently adjusting the diaphragm aperture factor, a threaded spindle rotatable about its axis and movable axially against spring loading to effect control of the diaphragm aperture, a first coupling means connecting said spindle with the first setting element, a second coupling means connecting said spindle with the second setting element, said first coupling means including a threaded bushing into which the spindle is screwed and a pinion on said bushing, said pinion being in engagement with the toothing on the first setting element, and said second coupling means including a pinion fixedly mounted on said spindle which meshes with the toothing of the second setting element, and an end stop in the housing towards which the bushing is urged by said spring loading and is engageable therewith.

3. A photographic camera according to claim 1 wherein the pinions in engagement with the teeth on the first and second setting elements respectively are axially movable in relation to said teeth, said spindle being operatively connected in the axial direction with the diaphragm blades, whereby on axial movement of said spindle movable together with the pinions, the diaphragm aperture is opened for the purpose of viewing through the latter.

4. A photographic camera according to claim 3 wherein the threaded spindle extends on both sides out of the threaded bushing.

5. In a photographic camera having a housing, a plurality of blades pivotally mounted in the housing to form a diaphragm aperture, a blade driving ring, a spring connected between said driving ring and said housing, exposure time mechanism, and a shutter cocking mechanism; the provision of a differential gearing for setting the exposure factors of diaphragm aperture and exposure time, the gearing comprising a first toothed setting element for adjusting the exposure time and the diaphragm aperture at constant light value, a second toothed setting element for independently adjusting diaphragm aperture factor, a threaded spindle rotatable about its axis and mounted in the housing so as to be axially movable, said spindle being engaged at one end thereof by a cam element which comprises part of one of said pivotally mounted blades, a first coupling means connecting said spindle with the first setting element, a second coupling means connecting said spindle with the second setting element, said first coupling means including a threaded bushing into which the spindle is screwed and a pinion on said bushing, said pinion being in engagement with the toothing on the first setting element, and said second coupling means including a pinion fixedly mounted on said spindle which meshes with the toothing of the second setting element, and an end stop in the housing towards which the bushing is urged by said spring and is engageable therewith.

6. A photographic camera according to claim 2, wherein a lug is provided on the second setting element, which lug is freely movable in a recess defined by stops, formed in the first setting element, said recess having a length corresponding to the range of the values to be covered by the setting movement of the threaded spindle.

7. A photographic camera according to claim 6, wherein the recess in first setting element is stepped to provide a plurality of stops giving at least two recessed portions representing ranges of values, in which the lug of the second setting element is adjustable.

8. A photographic camera according to claim 6, wherein a further spring is provided in the housing to axially load said second setting elements in a direction tending to bring the lug out of the recess.

9. In a photographic camera having a housing, a plurality of blades pivotally mounted in the housing to form a diaphragm aperture, a blade driving ring, exposure time mechanism, a shutter cocking mechanism and an exposure meter having a follow up pointer; the provision of a differential gearing for setting the exposure factors of diaphragm aperture and exposure time, the gearing comprising a first toothed setting element for adjusting the exposure time and the diaphragm aperture at constant light value, a second toothed setting element for independently adjusting the diaphragm aperture factor, a threaded spindle rotatable about its axis and movable axially against spring loading to effect control of the diaphragm aperture, a first coupling means connecting said spindle with the first setting element, a second coupling means connecting said spindle with the second setting element, said first coupling means including a threaded bushing into which the spindle is screwed and a pinion on said bushing, said pinion being in engagement with the toothing on the first setting element, and said second coupling means including a pinion fixedly mounted on said spindle which meshes with the toothing of the second setting element, an end stop in the housing towards which the bushing is urged by said spring loading and is engageable therewith, and means for transmitting the drive produced by the rotational movement of said spindle to the follow-up pointer of the exposure meter.

10. A photographic camera according to claim 9, wherein said means for transmitting the drive produced by the rotational movement of the spindle is a pinion.

11. A photographic camera according to claim 9 wherein said means for transmitting the drive produced by the rotational movement of the spindle is a cam disc.

12. In a photographic camera having a housing, a diaphragm exposure control means mounted in the housing, a time exposure control means mounted in the housing; the provision of a differential gearing comprising a first toothed setting element for adjusting the time exposure control means and the diaphragm exposure control means at constant light value, a second toothed setting element for independently adjusting said time exposure control means, a threaded spindle mounted in the housing so as to be rotatable about the axis of said spindle axially movable in the housing, a first coupling means connecting said spindle with the first setting element, and a second coupling means connecting said spindle with the second setting element, said first coupling means including a threaded bushing into which the spindle is screwed and a pinion on said bushing, said pinion being in engagement with the toothing on the first setting element, and said second coupling means including a pinion fixedly mounted on said spindle which meshes with the toothing of the second setting element.

References Cited in the file of this patent

UNITED STATES PATENTS

| 2,194,152 | Rizdorfer | Mar. 19, 1940 |
| 2,612,091 | Weiss | Sept. 30, 1952 |
| 2,938,446 | Singer | May 31, 1960 |
| 2,967,468 | Bretthauer | Jan. 10, 1961 |